United States Patent [19]

Yamada

[11] Patent Number: 4,973,117
[45] Date of Patent: Nov. 27, 1990

[54] SECONDARY HARMONIC GENERATOR HAVING WAVEGUIDES FOR A LASER BEAM

[75] Inventor: Masahiro Yamada, Miyagi, Japan

[73] Assignee: Sony Corporation, Tokyo, Japan

[21] Appl. No.: 419,255

[22] Filed: Oct. 10, 1989

[30] Foreign Application Priority Data

Oct. 11, 1988 [JP] Japan .............................. 63-255620
Dec. 2, 1988 [JP] Japan .............................. 63-304230

[51] Int. Cl.$^5$ .............................................. G02F 1/37
[52] U.S. Cl. .................................. 350/96.12; 307/430; 350/96.29
[58] Field of Search .................. 307/425–430; 350/96.10, 96.11, 96.12, 96.15, 96.16, 96.29, 96.30–96.34

[56] References Cited

U.S. PATENT DOCUMENTS

| | | | |
|---|---|---|---|
| 3,660,673 | 5/1972 | Anderson | 307/430 |
| 4,427,260 | 1/1984 | Puech et al. | 307/430 X |
| 4,564,997 | 1/1986 | Matsuo et al. | 437/61 |
| 4,763,019 | 8/1988 | Duguay et al. | 307/427 |
| 4,874,221 | 10/1989 | Ohsawa | 350/96.29 |

FOREIGN PATENT DOCUMENTS

1-68735 3/1989 Japan .............................. 350/96.12

OTHER PUBLICATIONS

Tien et al., "Optical Second Harmonic Generation . . . from a Thin-Film Waveguide", *Appl. Phys. Lett.*, vol. 17, No. 10, pp. 447–450.
Chen et al., "CW Harmonic Generation . . . Using a Thin-Film Waveguide . . . ", *Appl. Phys. Lett.*, vol. 25, No. 9, Nov. 1974, pp. 495–498.
Ito et al., "Phase-Matched Guided, Optical Second-Harmonic Generation . . . ", *Optics Commun.*, vol. 15, No. 1, Sep. 1975, pp. 104–107.

*Primary Examiner*—John D. Lee
*Attorney, Agent, or Firm*—Hill, Van Santen, Steadman & Simpson

[57] ABSTRACT

An optical wavelength conversion device, which is provided with a rigid type waveguide for efficiently converting a fundamental wave into the secondary harmonic wave and emitting the latter in the form of a beam of a circular or elliptic shape in section, and a process for manufacturing the ridge type waveguide. The optical wavelength conversion deivce essentially includes: an optical waveguide formed on a substrate of a nonlinear optical material so as to generate a secondary harmonic wave by Cerenkov radiation, and which has a first waveguide passage for confining a fundamental wave and converting it into the secondary harmonic wave, and a second waveguide passage for confining the generated secondary harmonic wave and propagating it toward an end face for emission therefrom.

3 Claims, 3 Drawing Sheets

FIG. 4A
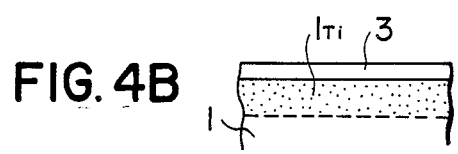
FIG. 4B
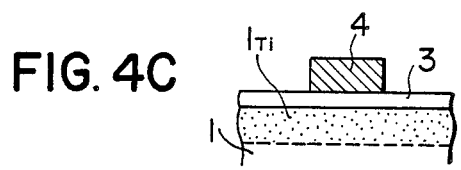
FIG. 4C
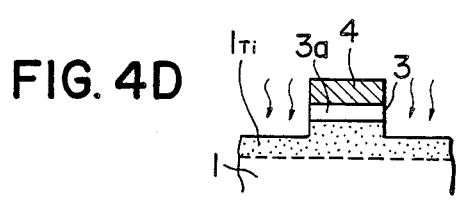
FIG. 4D
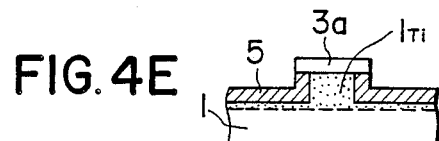
FIG. 4E
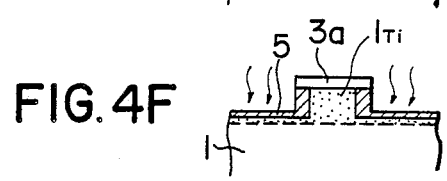
FIG. 4F
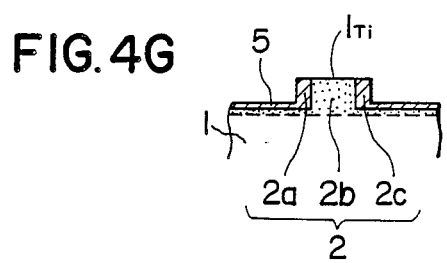
FIG. 4G
FIG. 5
(PRIOR ART)
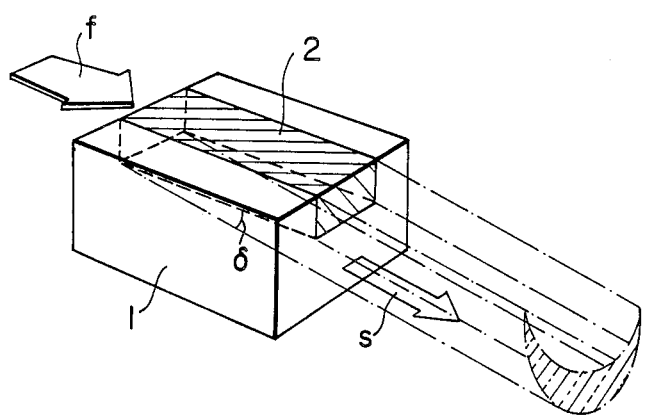

SECONDARY HARMONIC GENERATOR HAVING WAVEGUIDES FOR A LASER BEAM

BACKGROUND OF THE INVENTION

1. Field of the Invention

This invention relates to an optical wavelength conversion device or the so-called SHG (secondary harmonic generator), and more particularly to a waveguide type SHG, and a process for manufacturing a waveguide therefor.

More specifically, the invention concerns a waveguide type optical wavelength conversion device for producing a secondary harmonic wave by Cerenkov radiation which has an optical waveguide formed on a substrate of a nonlinear optical material and constituted by a first waveguide passage for confining a fundamental wave and a second waveguide passage for confining the secondary harmonic wave, the fundamental wave being converted into the secondary harmonic wave efficiently by the first waveguide and the nonlinear optical effect of the substrate and the resulting secondary harmonic wave is caused to propagate toward the end face of the second waveguide passage to emit therefrom a second harmonic radiation beam of a circular or elliptic shape.

Further, the invention concerns a process for manufacturing a ridge type optical waveguide with a ridge having a ridge angle of approximately 90° and smooth surfaces on the lateral sides, by selection of suitable kinds of masking photoresist and metal or a suitable kind of etching gas which permits reductions in light propagation loss and has a high degree of integration.

2. Description of the Prior Art

Previously there has been proposed an optical wavelength conversion device (hereinafter referred to simply as "SHG device" for brevity) constructed with a waveguide utilizing Cerenkov radiation, which is arranged as shown in FIG. 5.

This SHG device has an optical waveguide 2 formed on the surface of an LiNbO$_3$ single crystal substrate 1 with an ion exchange method using benzoic acid for confining a fundamental wave f into one end of the waveguide 2 and taking out the secondary harmonic wave s from the substrate 1. Namely, with this SHG device, a laser beam (a fundamental wave) f which is incident on an end face of the waveguide 2 is confined therein. (Guided Mode) At this time, the secondary harmonic wave (SH light) s which has one half of the wavelength of the fundamental wave f is generated by the nonlinear optical effect of lithium niobate (LiNbO$_3$) which constitutes the substrate and the high energy density of the fundamental wave f.

By selecting a suitable thickness for the optical waveguide 2, the thus-generated SH light s is radiated in the depthwise direction of the substrate 1 with a certain α angle (Cerenkov angle). (Radiation Mode)

With these steps the fundamental wave is converted into the secondary harmonic wave (SH light) by the above-mentioned prior art device.

Heretofore, there have also been known optical waveguides of different types including the so-called ridge type waveguide which has a narrow strip-like ridge formed on a substrate as shown in FIG. 6.

The ridge type waveguide has a laminated structure composed of a first substrate 11 with a refractive index $n_1$ and a second substrate 12 with a refractive index $n_2$. In this instance, the refractive indices of the first and second substrates and 12 satisfy the condition of $n_2 > n_1$. According to this construction, as light propagates, it is confined by the differences in the refractive indexes between the first and second substrates 11 and 12 in a direction vertical to the substrate and by the difference in the refractive indexes between the ridge 12a and air in a direction inward of the substrate plane. In FIG. 6, the reference character α indicates an angle (hereinafter referred to as the "ridge angle") which is formed by the lateral side surface of the ridge 12a and the horizontal face of the substrate.

A ridge type waveguide as shown in FIG. 6 can be formed by a selective growth or etching process. For instance, techniques of forming a ridge by a fine etching process were presented at the 1986 General National Meeting of the Society of Electronic Communications (Lecture No. 868). According to this process, for example, Ti is first deposited on a substrate of lithium niobate (LiNbO$_3$) to form a metal layer thereon, and then a layer of photoresist which has a tradename of "AZ-1350J" is selectively formed on the metal layer by photo lithography, followed by patterning of the metal layer by wet etching using the photoresist layer as a mask. Thereafter, the photoresist layer is removed, and the metal layer which remains as a result of the patterning is used as a mask to form a ridge on the substrate by electronic cyclotron resonance-reactive ion etching (ECR-RIE) using $C_3F_8$ as an etching gas.

The above-mentioned SHG device construction, however, has a drawback in that the beam of the SH light s is emitted in a crescent shape in the section as shown in FIG. 5, instead of in a circular shape which is desirable. Namely, taking a light source for a high density optical recording medium or a laser printer as an example of an application of the SHG device, the light source is required to be able to emit a beam of a circular or elliptic shape rather than a beam of crescent shape which would lower the efficiency of utilization.

In this connection, it may be conceivable to reform the emitted SH light beam from a crescent shape into a circular or elliptic shape, but it has been found extremely difficult to reform into a circular shape the SH light which tends to sink into the deep portions depthwise of the substrate.

In view of the above-mentioned drawbacks or problems inherent to the prior art techniques, it is an object of the present invention to provide an optical wavelength conversion device with a ridge type waveguide of improved construction, which is capable of generating a beam of substantially circular or elliptic shape.

With a conventional ridge type waveguide as shown in FIG. 6, in order to obtain high output, it is necessary to make the ridge angle α as close to 90° as possible and to form smooth surfaces on the lateral sides of the ridge by the ECR-RIE process. These requirements have to be met because a smaller ridge angle will result in a lower efficiency in confining light within the ridge, and rough side surfaces of the ridge will increase the light propagation loss by scattering. In this regard, there is a tendency that the increase of propagation loss due to rough side surfaces becomes larger as compared to ridges which have higher grade of fineness. However, by making the ridge angle α close to 90°, it becomes possible not only to improve the just-mentioned tendency but also to attain a higher integration of optical IC devices with ridge type waveguides.

Nevertheless, the ridge angle which can be achieved by the prior art techniques is 70°–80° at most, which is insufficient for efficiently confining light. Besides, the suppression of surface roughening is not enough. Especially in case of the techniques which use the so-called lift-off process, the side surfaces of a formed metal layer is susceptible to bruises or blemishes which will be reflected by roughening of the side surfaces of a ridge when the metal layer is subsequently used as a mask in a ridge-forming process.

Further, the ratio of the etch rate (i.e., the selectivity ratio of etching) of the crystal substrate to that of the mask metal is approximately as small as 2–3, which is not necessarily sufficient in terms of the economy, reliability and productivity of the process.

Under these circumstances, the present invention also has an object for the provision of a process for producing a ridge type waveguide with a ridge angle $\alpha$ approximating 90° and with smooth surfaces on the lateral sides of the ridge.

SUMMARY OF THE INVENTION

In accordance with the present invention, the above-mentioned objectives are achieved by the provision of an optical wavelength conversion device of the type which has an optical waveguide formed on a substrate of a nonlinear optical material, characterized in that the waveguide is of a ridge type and is composed of a first waveguide passage for confining a fundamental wave and by converting the same into the secondary harmonic wave, and a second waveguide passage for confining and propagating the secondary harmonic wave toward an end face for emission therefrom.

In the present invention, the fundamental wave which is confined in the first waveguide passage is efficiently converted into the secondary harmonic wave, with a wavelength which is one half of the fundamental wave, with the energy density of the fundamental wave itself and the nonlinear optical effect of the substrate. The converted secondary harmonic wave which is confined in the second waveguide passage is permitted to propagate in the guided mode or with repeated reflections, and is emitted from the end face of the waveguide in the form of a beam having a circular or elliptical shape.

The above and other objects, features and advantages of the invention will become apparent from the following description and the appended claims, taken in conjunction with the accompanying drawings which show by way of example preferred embodiments of the invention.

BRIEF DESCRIPTION OF THE DRAWINGS

In the accompanying drawings:

FIGS. 4A–4G are diagrammatic illustration explanatory of a process for manufacturing the device;

FIG. 5 is a perspective view of a conventional optical wavelength conversion device.

DESCRIPTION OF THE PREFERRED EMBODIMENTS

Before going into description of preferred embodiments of the invention, the steps of observations which have led to the present invention ar explained first.

The beam shape of the secondary harmonic wave which is emitted from an optical wavelength conversion device varies depending upon the condition of propagation of the Cerenkov radiation within the device and the condition of propagation can be varied by changing the shape of the waveguide.

It follows that the beam of the secondary harmonics wave emitted from the device could be reformed into a circular or elliptical shape by employing a waveguide of a suitable shape.

Figure 2:
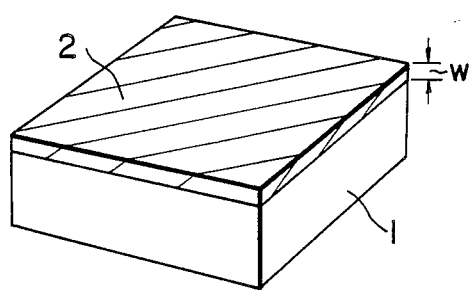
FIGS. 2 and 3 are diagrammatic illustrations employed for the explanation of principles of the invention.

A question arises as to what shape is suitable for the waveguide for this purpose. First, considering a slab type waveguide which has, for simplicity of explanation, a filmlike optical waveguide 2 formed on the surface of a substrate 1 as shown in FIG. 2, the propagation of light through the optical waveguide becomes difficult if the thickness w of the waveguide 2 becomes smaller than a certain value which is determined depending upon the material of the substrate 1, the manufacturing process of the optical waveguide 2 and the optical wavelength. Namely, the propagation of light through the optical waveguide is possible when the thickness w of the waveguide 2 is greater than a certain thickness.

Figure 3:
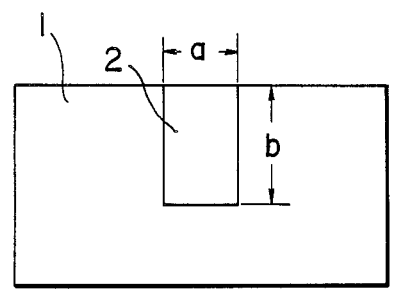
Figure 6:
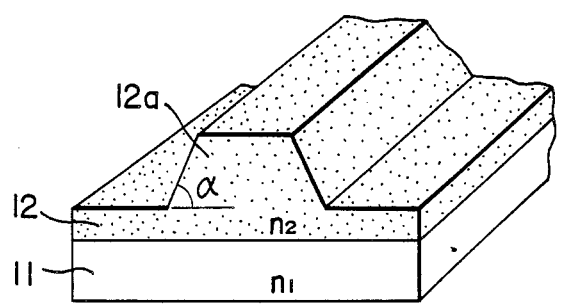
FIG. 6 is a diagrammatic perspective view showing on an enlarged scale the general construction of a convention ridge type optical waveguide having a ridge type waveguide passage.

For example, FIG. 3 diagrammatically shows an optical waveguide 2 which is formed on a substrate 1 of a nonlinear optical material such as single crystal LiNbO$_3$. The optical waveguide 2 has a sectional shape with a thickness a in the direction parallel with the surface of the substrate 1 and a thickness b in the depthwise direction of the substrate 1. In this instance, by forming the optical waveguide 2 in a sectional shape where the thicknesses a and b are greater than thicknesses which makes the propagation of the fundamental wave infeasible, namely, greater than a cutoff thickness W$_r$f of the fundamental wave, the thickness a is smaller than the secondary harmonic wave cutoff thickness W$_r$s, and the thickness b is larger than the secondary harmonic wave cutoff thickness W$_r$s, the secondary harmonic wave can be propagated parallel with the surface of the substrate 1 without propagation in the depthwise direction of the substrate 1.

The present invention, which has been achieved based on the above-described principles, is described more particularly hereafter by way of preferred embodiments.

Figure 1:
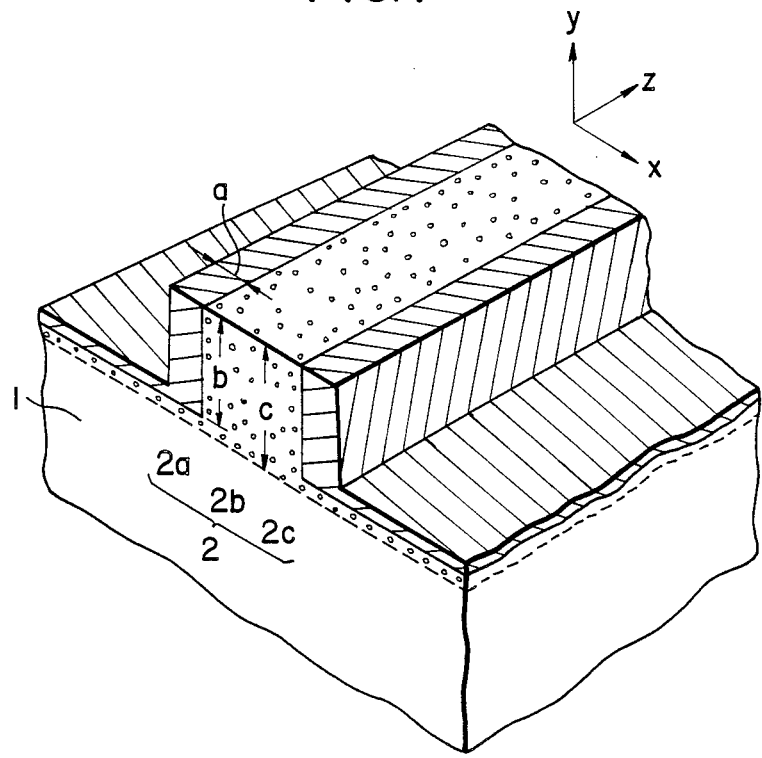
FIG. 1 is a perspective view of an optical wavelength conversion device according to the present invention.

FIG. 1 shows an embodiment of the invention, which has an optical waveguide 2 formed on a substrate 1 of single crystal LiNbO$_3$, in a shape which satisfies the conditions which will be discussed.

More specifically, the substrate 1 has a ridge type optical waveguide 2 formed in a ridge portion 1$_1$. The optical waveguide 2 is composed of first waveguide passages 2a and 2c which are formed symmetrically in the opposite side portions of the ridge 1$_1$, and a second waveguide passage 2b which is formed between the first waveguide passages 2a and 2c. The first waveguide passages 2a and 2c and the second waveguide passage 2b, each have a required refractive index. The first waveguide passages are dimensioned so as to satisfy the conditions of $$W_r f < a < W_r s$$

$$W_r f, W_r s < b$$

where a is the width of the first waveguide members 2a and 2c in a direction parallel with the surface of the ridge portion $1_1$, namely, in the direction of x, b is the thickness (or height) of the first waveguide passages 2a and 2c in a direction parallel with lateral side surfaces of the ridge portion $1_1$ or in the direction of y, $W_r f$ is the fundamental wave cutoff thickness, and $W_r s$ is the secondary harmonic wave cutoff thickness of the waveguide. The fundamental wave is confined in both the x and y directions, while the secondary harmonic wave is confined in y direction but is radiated in x direction.

The second waveguide member 2b is formed in a ridge structure which is greater than the secondary harmonic wave cutoff thickness $W_r s$ in thickness or in thickness c in y direction, satisfying the condition of $$W_r s < c$$

and which confines the secondary harmonic wave in both the y and x directions.

Upon irradiating a laser beam on one end face of the optical wavelength conversion device of this embodiment with the above-described construction, the laser light is condensed toward both or one of the end faces of the first waveguide 2a and 2c and the second waveguide 2b, and is confined in both or one of the first waveguide 2a and 2c and the second waveguide 2b.

By the energy density of the laser light itself and the nonlinear optical effect of the waveguide and substrate 1, the confined laser light is efficiently converted into a wave which is one half in wavelength of the fundamental wave, namely, into a secondary harmonic wave (SH light), and is confined in the waveguide including the first and second waveguide passages 2a to 2c and is propagated in the z-direction in the guided mode or by repeating reflections between the first and second waveguide passage and is emitted from the opposite end face of the secondary wave in the form of a beam of a circular or elliptic shape.

If desired, either one of the first waveguide passages 2a and 2c of the above-described embodiment may be omitted. Even in such a case, the secondary harmonic wave can be generated in a similar manner.

An example of the process for manufacturing the optical wavelength conversion device according to the invention will be described with reference to FIGS. 4A–4G.

First, a titanium diffusion layer $1_{Ti}$ is formed on the front surface of the LiNbO$_3$ substrate 1 by diffusion of titanium Ti as shown in FIG. 4A.

A masking metal layer 3 (of Ni, Cu, Ta, Ti or the like) is then formed on the front surface of the substrate 1 by vapor deposition as shown in (FIG. 4B), and a resist 4 is coated thereon in a predetermined pattern as shown in FIG. 4C.

Then as shown in FIG. 4D, the front side of the substrate is subjected to ECR-RIE (Electron Cyclotron Resonance Reactive Ion Etching, i.e., reactive ion etching which utilizes the phenomenon of electron cyclotron resonance) using $CF_4$, $C_2F_6$, $C_3F_8$, CHF or the like as an etching gas. As a result of this etching, the mask layer 3, except those portions which underlie the resist 4, and the surface portions of the titanium diffusion layer $1_{Ti}$ are removed. The mask layer portion 3 which lies under the resist 4 remains to serve as a mask 3a.

Alternatively, a ridge can be formed by a two-stage etching process, namely, a process consisting of a stage of etching a metal layer by the use of argon and a stage of etching the substrate surface with the resulting masking metal layer by the use of a fluorocarbon gas. Accordingly, the masking metal layer should have properties which permit easy etching by argon gas but have sufficient resistance to the fluorocarbon gas to be used. On the other hand, the substrate should have properties which ensure sufficient resistance to argon gas but permit easy etching by the fluorocarbon gas used.

Table 1 below shows the etch rates of various substance by argon gas in comparison with etch rates by $CF_4$ gas, taken as an example of fluorocarbon gases. The substances shown here include lithium niobate which is widely used as a nonlinear optical material for the substrate, and Ta, Ti, Ag, Al, Ni and Cu which are used as a masking metal. As a reference, etch rates of known photoresists, TSMR8900 and AZ4210 (products of Tokyo Ohka Kogyo), are also shown in the table.

TABLE 1

| Substance Etched | Etch Rate(A/min) Argon | $CF_4$ |
|---|---|---|
| Lithium niobate | 30 | 110 |
| Ta | 45 | >110 |
| Ti | 15 | >110 |
| Ag | 360 | >110 |
| Al | 15 | 52 |
| Ni | 80 | 10 |
| Cu | 220 | 15 |
| TSMR8900 | 105 | 300 |
| AZ42210 | 220 | 400 |

In the present invention, each of the etching stages using either argon or a fluorocarbon gas is carried out by means of an electron cyclotron resonance type etching (ECR etching) apparatus, which utilizes the phenomenon that, when the cyclotron angular frequency of electrons in circular motion in a magnetic field come into synchronism with the angular frequency of an electric field of micro wave which is introduced through a wave tube, the electrons are accelerated by resonantly absorbing the micro wave energy, efficiently producing plasma through collision against neutral molecules and ionization. With an ECR etching apparatus, an ion beam of good directivity can be obtained at a gas pressure as low as $10^{-4}$ Torr, so that it is possible to carry out the etching in a stable manner against reactive gases, and coupled with advantages such as high accuracy of etching shape and the improbability of re-decomposition and re-deposition of reaction products. The ECR etching can be carried out under generally acceptable conditions, for example, with a gas flow rate of 2 SCCM, a gas pressure of $10^{-5}$–$10^{-3}$ Torr, a micro wave power of 200 W, and an acceleration voltage of 400 V.

Thus, by selecting and combining suitable kinds of photoresist, metals and etching gases, a ridge having a ridge angle $\alpha$ close to 90° can be formed on the substrate by the ECR etching with excellent directivity and through the utilization of the properties of the respective materials.

The feasibility of the above-described ridge-forming process leads to realization of a secondary harmonic generator (SHG) device which has, along one lateral side of the ridge, a region with a refractive index which is higher than that of the ridge which can serve as a first waveguide for propagating a fundamental wave (radiated directly from a light source), and, in the remaining ridge portion, a second waveguide is formed for propagating the secondary harmonic wave radiated from the region of higher refractive index. When such an SHG device has a ridge angle of approximately 90°, it can efficiently confine into the ridge the secondary harmonic wave which is radiated from the above-mentioned region at a predetermined Cerenkov angle.

In a heat treatment in pyrophosphoric acid, benzoic acid or the like, proton exchange occurs to the exposed surface portions of the titanium diffusion layer $1_{Ti}$ as well as in the opposite side portions of the titanium diffusion layer $1_{Ti}$ under the mask $3a$ for forming a proton exchange layer 5. FIG. 4E) In this treatment, the resist 4 is removed.

Then, the work is subjected to etching again in an ECR-RIE apparatus. This time, the proton exchange layer 5 is etched only at its surface portions which are exposed by the mask $3a$, and as a result a thin proton exchange layer 5 remains on the exposed surface portions.

In this stage of etching, the exposed portions of the proton exchange layer 5 may be totally removed if desired.

Then the mask $3a$ is removed as shown in FIG. 4G.

After the removal of the mask $3a$, there is obtained an optical wavelength conversion device as shown in FIG. 1, with first waveguide passages $2a$ and $2c$ constituted by the exposed portions of the proton exchange layer 5 and a second waveguide passage $2b$ constituted by the titanium diffusion layer $1_{Ti}$ between the first waveguide passages $2a$ and $2c$.

As is clear from the foregoing description, the optical wavelength conversion device according to the invention has, on a substrate of a nonlinear optical material, an optical waveguide which is composed of a first waveguide passage for confining a fundamental wave and converting it into a secondary harmonic wave, and a second waveguide passage for confining the secondary harmonic wave and propagating it toward an end face for emission therefrom. With this arrangement, the fundamental wave is efficiently converted into the secondary harmonic wave, which is then emitted in the form of a beam having a circular or elliptical shape in section. This beam of improved shape can be applied widely and efficiently as a light source in high density optical recording, as a light source for a laser printer, and so forth.

Further, the process according to the present invention makes it possible to form a ridge type waveguide with a ridge angle $\alpha$ of approximately 90° which has smooth side surfaces. Accordingly, it becomes possible to suppress the light propagation loss to an extremely low level and to enhance the degree of circuit integration. Besides, the laser light beam of a circular or elliptical shape, which is obtained from the ridge type waveguide of the above-described construction, it is extremely suitable for application to an optical disk system, laser printer or the like. Further, since an ECR etching apparatus can be commonly used for patterning a metal layer and for shaping a ridge on a substrate, improvements in production also result due to the manufacturing techniques.

Although the invention has been described with respect to preferred embodiments, it is not to be so limited as changes and modifications can be made which are within the full intended scope of the invention as defined by the appended claims.

I claim as my invention:

1. An optical wavelength conversion device, comprising: an optical waveguide formed on a substrate of a nonlinear optical material so as to generate a secondary harmonic wave by Cerenkov radiation, and having a first waveguide passage for confining a fundamental wave and converting it into a secondary harmonic wave, and a second waveguide passage for confining said secondary harmonic wave and propagating it toward an end face for emission therefrom, wherein said first and second waveguide formed with a ridge shape on a substrate, and said first waveguide passage is formed so as to be in contact with said second waveguide passage on at least one of the lateral side surfaces of said ridge which is perpendicular to the major surface of said substrate, wherein the following condition is satisfied, $$n_2 > n_3 > n_1$$

wherein $n_1$, $n_2$ and $n_3$ are, respectively, the refractive indices of said substrate, said first waveguide passage and said second waveguide passages, and wherein said first and second waveguide passages are formed so as to satisfy the conditions $$W_rf < a < W_rs,$$

$$W_rf \text{ or } W_rs < b, \text{ and}$$

$$W_rs < c$$

wherein a is the width of said first waveguide passage in a direction which is parallel with said major surface of said substrate, b is the depth of said first waveguide passage in a direction which is perpendicular to the major surface of said substrate, c is the depth of said second waveguide passage in a direction which is perpendicular to the major surface of said substrate, $W_rF$ is the cutoff thickness for the fundamental optical wave, and $W_rs$ is the cutoff thickness for the secondary harmonic wave.

2. A process for manufacturing a ridge type optical waveguide device comprising the steps of:
   forming, on a substrate of a nonlinear optical material which has a refractive index $n_1$, an optical waveguide layer which is to be used as a second waveguide passage and which has a refractive index $n_3$ ($n_3 > n_1$) by diffusion of titanium;
   forming a metal layer on said substrate;
   selectively forming a photoresist layer on said metal layer;
   selectively removing a part of said metal layer and said optical waveguide layer, using said photoresist layer as a mask;
   forming, on a lateral side of said optical waveguide layer, a proton exchange layer which is to be used as a second waveguide passage and which has a refractive index $n_2$ ($n_2 > n_3 > n_1$), by a heat treatment in an aqueous solution capable of proton exchange with optical waveguide portions which are exposed by removal of said metal layer; and
   removing the remaining portions of said metal layer.

3. A process as defined in claim 2, comprising, after formation of said proton exchange layer, the step of etching said proton exchange layer into a thin layer by reactive ion etching using selectively unremoved portions of said metal layer as a mask.

* * * * *